(12) United States Patent
Yamauchi

(10) Patent No.: US 9,829,303 B2
(45) Date of Patent: Nov. 28, 2017

(54) SHAPE MEASURING APPARATUS

(71) Applicant: Tokyo Seimitsu Co., Ltd., Tokyo (JP)

(72) Inventor: Yasuhiro Yamauchi, Tsuchiura (JP)

(73) Assignee: TOKYO SEIMITSU CO., LTD., Tokyo (JP)

( * ) Notice: Subject to any disclaimer, the term of this patent is extended or adjusted under 35 U.S.C. 154(b) by 0 days.

(21) Appl. No.: 15/497,722

(22) Filed: Apr. 26, 2017

(65) Prior Publication Data

US 2017/0227346 A1    Aug. 10, 2017

Related U.S. Application Data

(63) Continuation of application No. PCT/JP2015/070568, filed on Jul. 17, 2015.

(30) Foreign Application Priority Data

Oct. 28, 2014   (JP) ................................. 2014-219310
Jun. 24, 2015   (JP) ................................. 2015-126911

(Continued)

(51) Int. Cl.
    *G01B 5/20*     (2006.01)
    *G01B 5/012*    (2006.01)
    *G01B 5/28*     (2006.01)

(52) U.S. Cl.
    CPC .............. *G01B 5/20* (2013.01); *G01B 5/012* (2013.01); *G01B 5/28* (2013.01)

(58) Field of Classification Search
    CPC .......... G01B 5/012; G01B 7/012; G01B 5/20; G01B 5/28

(Continued)

(56) References Cited

U.S. PATENT DOCUMENTS 4,265,022 A * 5/1981 Noguchi ................ G01B 3/008
                                                        33/553
4,377,911 A * 3/1983 Iida .......................... G01B 5/20
                                                        33/551

(Continued)

FOREIGN PATENT DOCUMENTS

EP    0125791 A2    11/1984
EP    2345869 A1    7/2011

(Continued)

OTHER PUBLICATIONS

Japanese Office Action 2015-130664, with English Translation (dated Aug. 12, 2015), 8pgs.

(Continued)

*Primary Examiner* — Christopher Fulton
(74) *Attorney, Agent, or Firm* — Morgan, Lewis & Bockius LLP

(57) ABSTRACT

In a shape measuring apparatus for measuring the roughness and/or contour of a surface of a workpiece by sliding a sensing pin on a tip end side of an arm on the workpiece, the arm is provided with an engagement mechanism that makes a sensing pin side of the arm removable to a base end side of the arm. The engagement mechanism has two engagement surfaces which face each other and attract each other by a magnetic force. One of the engagement surfaces includes a linear first groove that is in parallel to an axis of the arm and another engagement part that is different from the first groove, and the other of the engagement surfaces includes a first fitting pin that is positioned to be fitted into the first groove and a second fitting pin that is fitted into the other engagement part.

15 Claims, 13 Drawing Sheets

(30) Foreign Application Priority Data

Jun. 30, 2015 (JP) ................................ 2015-130664
Jul. 8, 2015 (JP) ................................ 2015-136998

(58) Field of Classification Search
USPC ..................................... 33/501.02, 556, 559
See application file for complete search history.

(56) References Cited

U.S. PATENT DOCUMENTS

| | | | |
|---|---|---|---|
| 4,574,625 A | 3/1986 | Olasz | |
| 5,028,901 A * | 7/1991 | Enderle | B23Q 3/15526 33/561 |
| 5,756,886 A * | 5/1998 | Nishimura | G01B 7/016 33/558 |
| 5,918,378 A * | 7/1999 | McMurtry | G01B 7/012 33/556 |
| 6,164,124 A * | 12/2000 | Fujii | G01B 7/34 33/551 |
| 6,678,966 B1 * | 1/2004 | Koga | G01B 5/012 33/558 |
| 6,874,243 B2 * | 4/2005 | Hama | G01B 5/28 33/551 |
| 6,901,678 B2 * | 6/2005 | Kubota | G01B 5/20 33/551 |
| 7,363,181 B2 * | 4/2008 | Katayama | G01B 5/28 33/503 |
| 8,141,261 B2 * | 3/2012 | Engel | G01B 5/012 33/503 |
| 8,701,301 B2 * | 4/2014 | Nakayama | G01B 3/008 33/554 |
| 9,074,865 B2 * | 7/2015 | Yamauchi | G01B 5/20 |
| 2011/0083335 A1 | 4/2011 | Yasuno et al. | |
| 2012/0266475 A1 | 10/2012 | Nakayama | |

FOREIGN PATENT DOCUMENTS

| | | |
|---|---|---|
| EP | 2515069 A2 | 10/2012 |
| JP | 59-218901 | 12/1984 |
| JP | 2012-225742 | 11/2012 |

OTHER PUBLICATIONS

Japanese Office Action 2015-130664, with English Translation (dated Sep. 29, 2015), 8pgs.
Japanese Office Action 2015-136998, with English Translation (dated Aug. 12, 2015), 11 pgs.
IPRP PCT/JP2015/070568, with English Translation, dated Jul. 7, 2015, 13pgs.
Tokyo-Seimitsu Co. Ltd., Extended European Search Report, EP15855402.2, dated Sep. 1, 2017, 8 pgs.

* cited by examiner

FIG.5
(A)
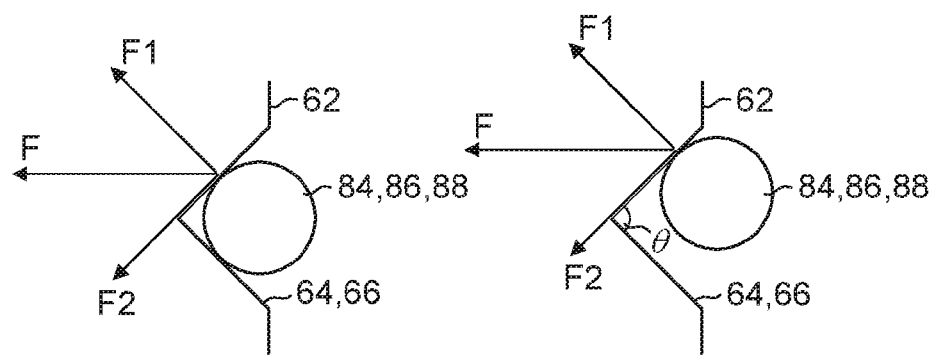
(B)
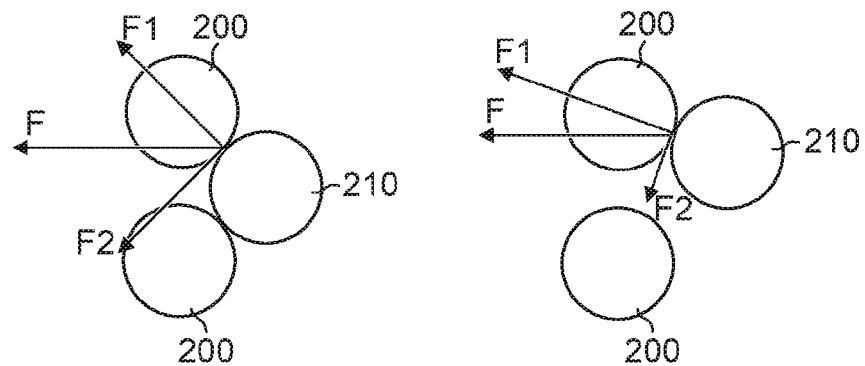

FIG.7
(A)
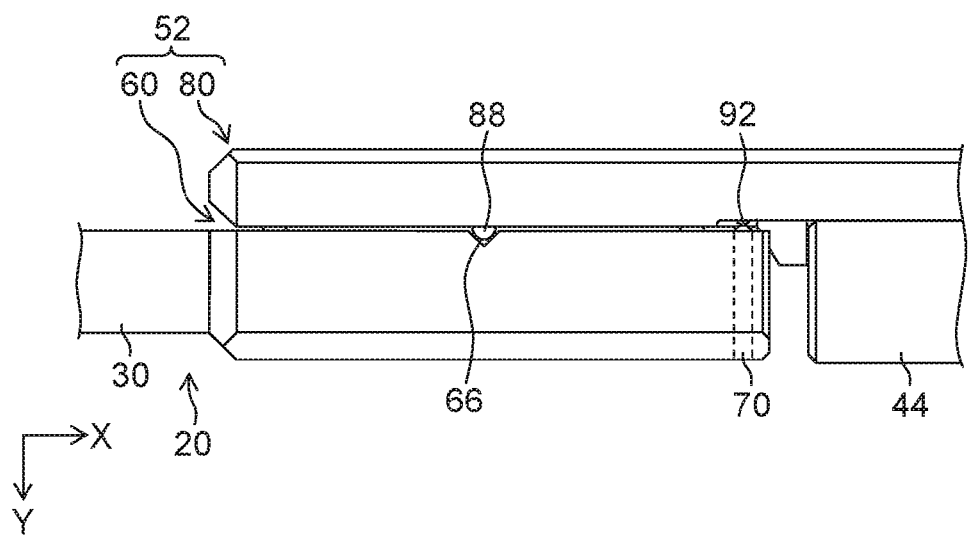
(B)
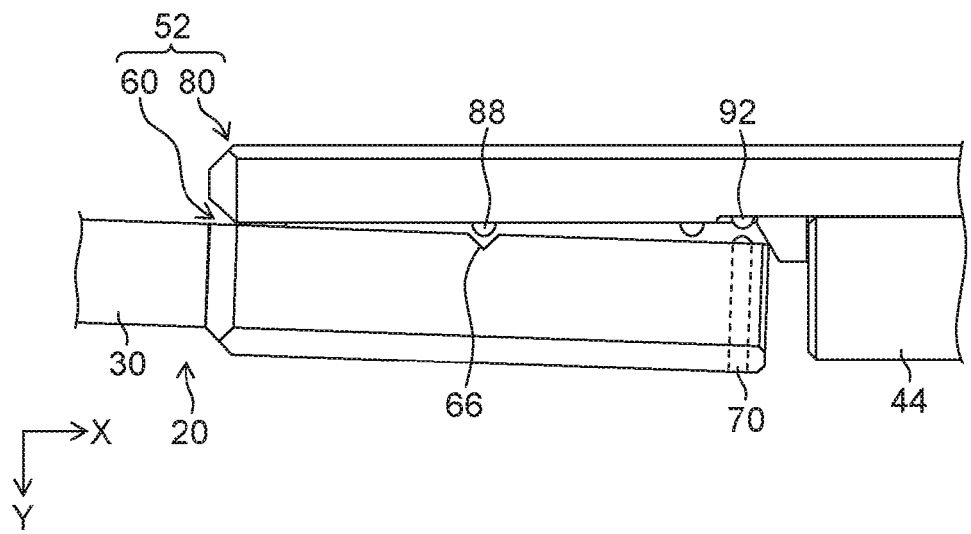

FIG.9
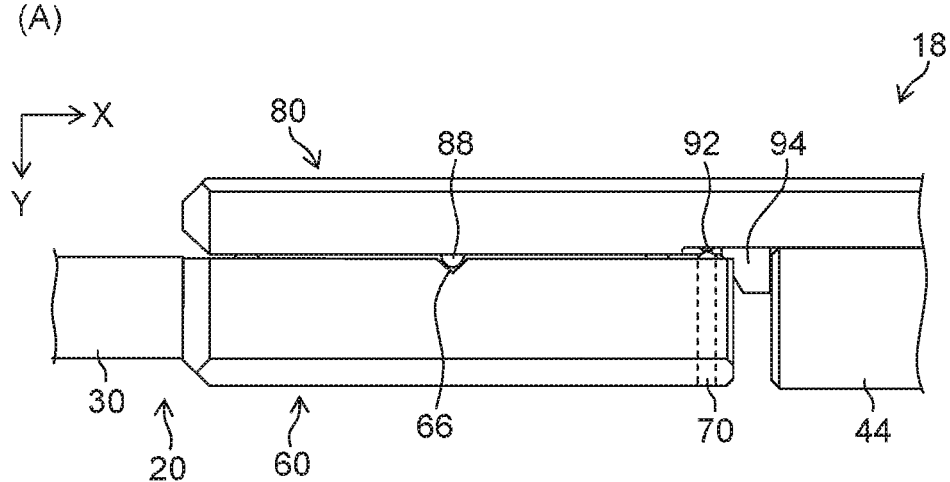
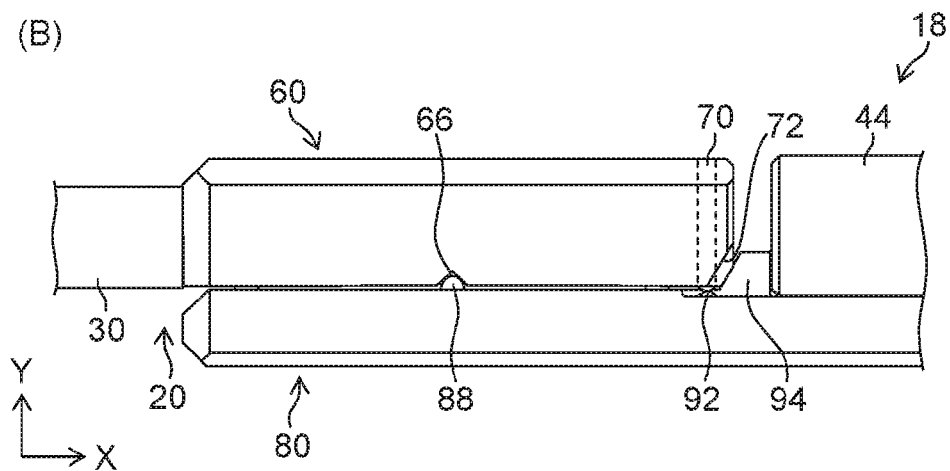
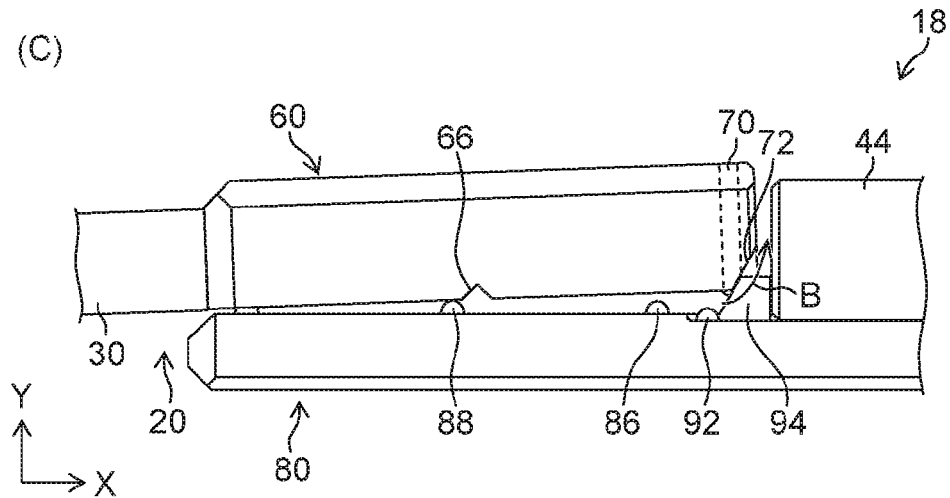

FIG.11
(A)
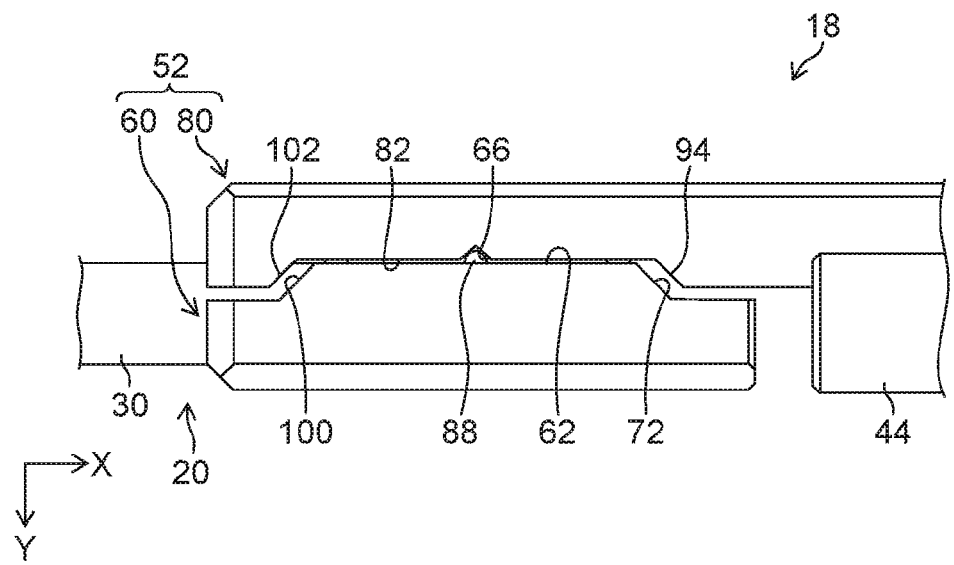
(B)
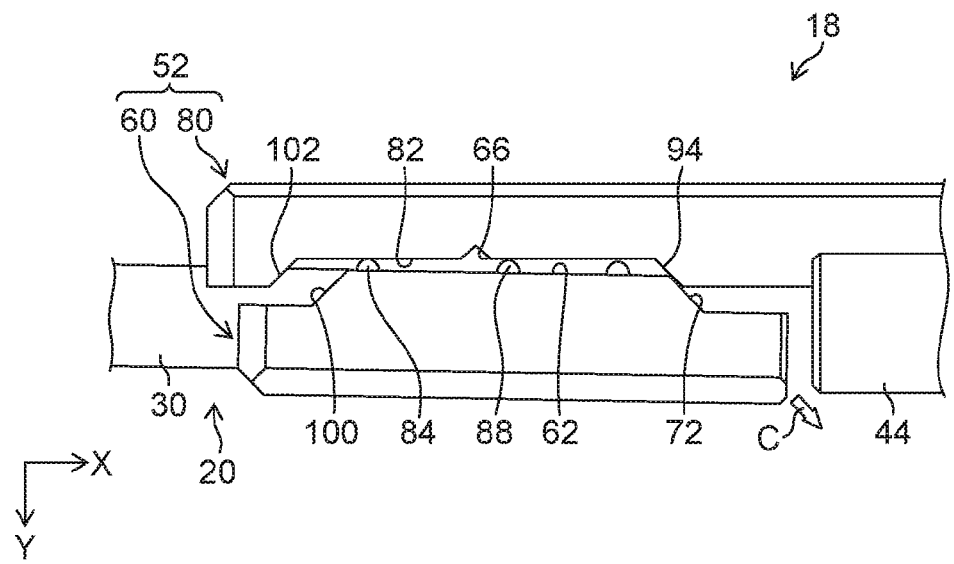

FIG.12
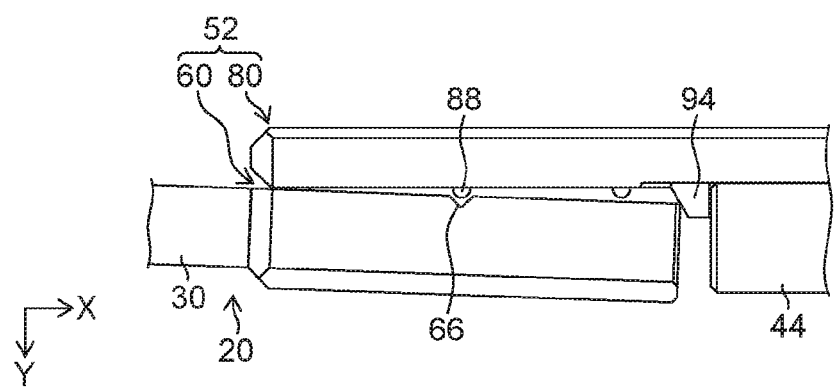
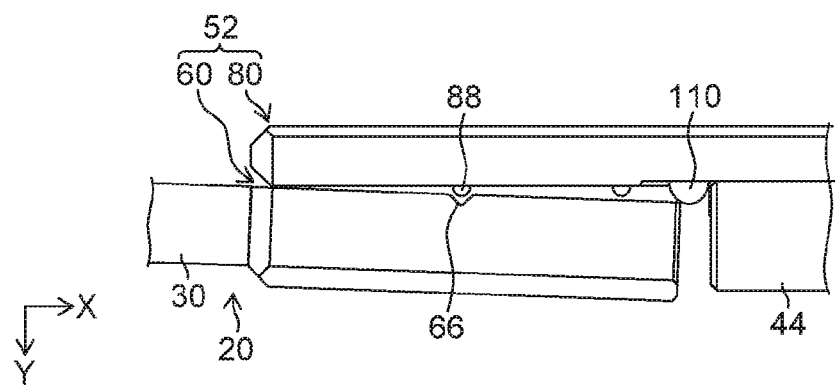
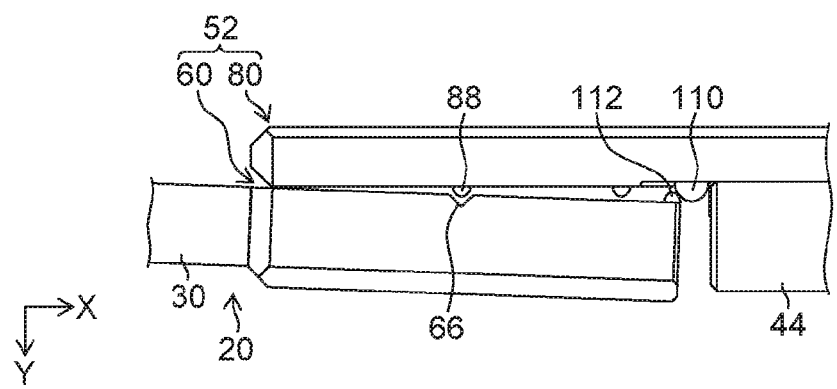
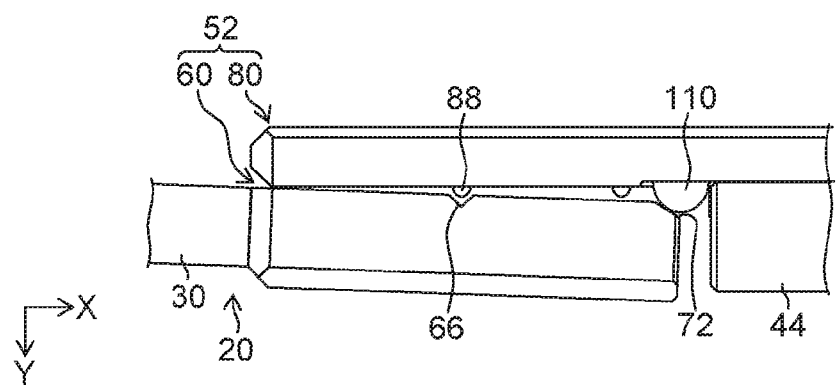

SHAPE MEASURING APPARATUS

CROSS-REFERENCE TO RELATED APPLICATIONS

This application is a Continuation of PCT International Application No. PCT/JP2015/070568 filed on Jul. 17, 2015, which claims priority under 35 U.S.C. §119(a) to Japanese Patent Application Nos. 2014-219310, 2015-126911, 2015-130664 and 2015-136998 respectively filed on Oct. 28, 2014, Jun. 24, 2015, Jun. 30, 2015 and Jul. 8, 2015. Each of the above application(s) is hereby expressly incorporated by reference, in its entirety, into the present application.

BACKGROUND OF THE INVENTION

Field of the Invention

The present invention relates to a shape measuring apparatus, and to a shape measuring apparatus in which probes can be exchanged.

Description of the Related Art

There is known a shape measuring apparatus in which a detector having a probe is moved along a surface of a workpiece and a displacement amount of a tip end part of the probe is converted into an electrical signal, which is read in a calculation processing device (calculator) such as a computer, thus measuring a surface shape and the like of the workpiece such as the surface roughness or the contour.

In the shape measuring apparatus, the probe is exchanged for a probe corresponding to a shape of the workpiece from the plurality of probes to measure the shape of the workpiece.

Japanese Patent Application Laid-Open No. 2012-225742 (herein after, referred to as PTL 1) discloses a surface texture measuring device that is provided with a measuring arm including a first measuring arm that is supported to be swingable around a support shaft and a second measuring arm that has a stylus provided through a removal mechanism. This removal mechanism includes a positioning mechanism, a magnetic body and a magnet.

SUMMARY OF THE INVENTION

The positioning mechanism of the removal mechanism in PTL 1 is configured of a seating part formed of a pair of columnar positioning members, and an engagement spherical part corresponding to the seating part. The positioning mechanism is designed such that the engagement spherical part is guided by the pair of columnar positioning members configuring the seating part to be fitted in a correct position.

However, the structure with the pair of columnar positioning members and the engagement spherical part has a first problem in a stability in positioning because a pulling force (component force) varies during a period until the engagement spherical part is fitted, depending upon positions of the pair of columnar positioning members and the engagement spherical part by the time the engagement spherical part is fitted in the correct position.

In addition, the structure has the second problem that the second measuring arm and the first engagement arm may collide with each other to generate an impact when the second measuring arm including the stylus may be subjected to an unexpected external force.

The present invention is made in view of the circumstances, and aims to provide a shape measuring apparatus that can stably exchange a plurality of probes, and a shape measuring apparatus that can avoid an impact.

According to a shape measuring apparatus in an aspect of the present embodiment, in a shape measuring apparatus for measuring roughness and/or contour of a surface of a workpiece by sliding a sensing pin provided on a tip end side of an arm with respect to the workpiece in an axial direction of the arm, the arm includes an engagement mechanism which makes a sensing pin side of the arm removable from a base end side of the arm, the engagement mechanism including two engagement surfaces configured to face each other, to be perpendicular to the surface of the workpiece and to be parallel to the axial direction of the arm, wherein the two engagement surfaces attract each other by a magnet and a magnetized member in corresponding positions on the engagement surfaces, one of the engagement surfaces includes a linear first groove that is parallel to an axis of the arm and another engagement part that is different from the first groove, and another of the engagement surfaces includes a first fitting pin that is positioned to be fitted into the first groove and a second fitting pin that is configured to be fitted into the another engagement part.

Preferably the another engagement part is formed of a second groove.

Preferably the first groove and the second groove respectively have a V-shaped cross section.

Preferably an angle of each of the first groove and the second groove formed in the V-shaped cross section is within a range of 80° or more to 120° or less.

Preferably the first fitting pin comprises a first positioning pin and a second positioning pin, and the second fitting pin comprises a third positioning pin.

Preferably the first positioning pin, the second positioning pin and the third positioning pin are spherical.

Preferably a detection circuit includes an operating pin provided on the one of the engagement surfaces and a sensor provided on the another of the engagement surfaces, the detection circuit being configured to detect contact and non-contact of the engagement surfaces.

Preferably the sensor and the operating pin are arranged outside of a virtual triangle connecting the first positioning pin, the second positioning pin and the third positioning pin, and arranged in base end sides of the engagement surfaces.

Preferably the engagement surface includes an inclined part that is perpendicular to the surface of the workpiece and is inclined to the engagement surface, and when the arm in the sensing pin side is pressed on the arm in the base end side, the arm in the sensing pin side slides on a surface of the inclined part and is released from the arm in the base end side.

According to a shape measuring apparatus in another aspect of the present embodiment, in a shape measuring apparatus for measuring roughness and/or contour of a surface of a workpiece by sliding a sensing pin provided on a tip end side of an arm with respect to the workpiece in an axial direction of the arm, the arm includes an engagement mechanism which makes a sensing pin side of the arm removable from a base end side of the arm, the engagement mechanism including two engagement surfaces configured to face each other, to be perpendicular to the surface of the workpiece and to be parallel to the axial direction of the arm, wherein the two engagement surfaces attract each other by a magnet and a magnetized member in corresponding positions on the engagement surfaces, the engagement surface includes a running-on part in which the arm in the sensing pin side runs on the arm in the base end side, and when the arm in the sensing pin side presses or pulls the arm in the base end side, the arm in the sensing pin side slides on a surface of the running-on part and runs on the running-on part to be released from the arm in the base end side.

Preferably the engagement surfaces facing each other are perpendicular to the workpiece.

Preferably the engagement surface on an opposite side to the engagement surface on which the running-on pan is formed includes a surface facing the running-on part, and the surface slides on the surface of the running-on part.

Preferably a detection circuit includes an operating pin provided on one of the engagement surfaces and a sensor provided on another of the engagement surfaces, the detection circuit configured to detect contact and non-contact of the engagement surfaces.

According to the shape measuring apparatus in one aspect of the present invention, the plurality of probes can be exchanged easily and stably.

According to the shape measuring apparatus in another aspect of the present invention, the impact can be avoided.

BRIEF DESCRIPTION OF THE DRAWINGS

FIG. 5 shows explanatory diagrams explaining a pulling force.

FIG. 7 shows explanatory diagrams explaining functions of a sensor and an operating pin.

FIG. 9 shows schematic configuration diagrams illustrating an engagement mechanism for avoiding an impact.

FIG. 11 shows schematic configuration diagrams illustrating further another engagement mechanism for avoiding the impact.

FIG. 12 shows schematic configuration diagrams illustrating a plurality of engagement mechanisms for avoiding the impact.

DETAILED DESCRIPTION OF THE EMBODIMENTS

Hereinafter, preferred embodiments of the invention will be in detail described with reference to the accompanying drawings.

Figure 1:
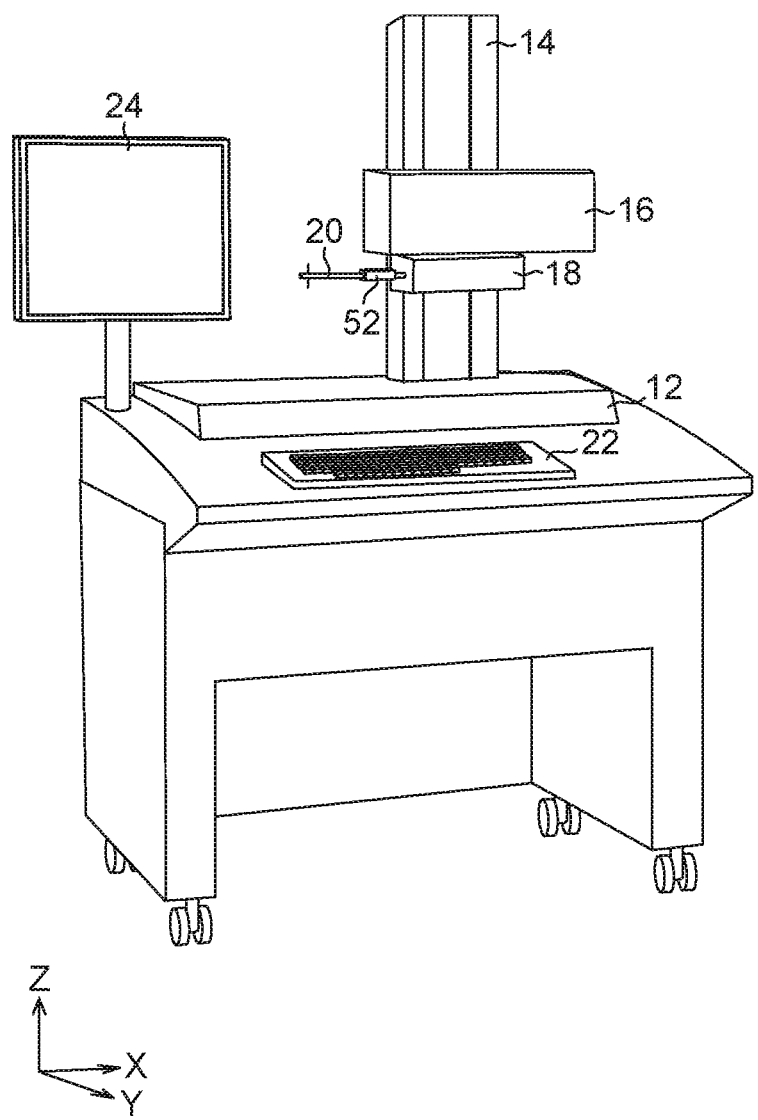
FIG. 1 is an outline view of a shape measuring apparatus.

FIG. 1 is an outline view of a shape measuring apparatus to which the present invention is applied. A shape measuring apparatus 10 includes a surface plate 12, a column 14 provided on the surface plate 12, an X axis driving unit 16 that is supported by the column 14 to be movable in a Z axis direction and is movable in an X axis direction, a displacement detector 18 that is attached to the X axis driving unit 16, a probe 20 that is removably attached to the displacement detector 18, an input device 22 for inputting instructions to a control device (unillustrated), and a display device 24 for displaying a measurement result and the like.

Figure 2:
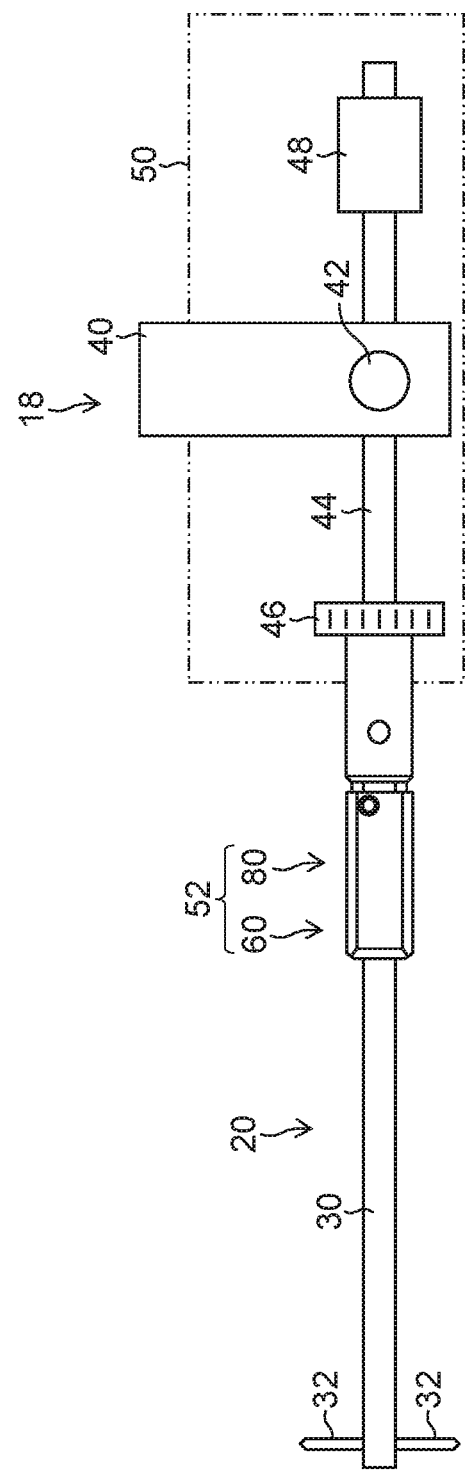
FIG. 2 is a schematic configuration diagram of a probe and a displacement detector.

FIG. 2 is a schematic diagram illustrating a structure of the probe 20 and the displacement detector 18. The probe 20 has a probe arm 30 and sensing pins 32 that are provided on both sides at a tip end side of the probe arm 30 in order to perform shape measurement. The embodiment shows the probe 20 having the sensing pins 32 that are disposed on both the sides at the tip end of the probe arm 30. However, the probe arm 30 may be provided with at least one sensing pin 32 that is formed on one side for shape measurement.

The displacement detector 18 is provided with a driving unit connecting part 40, a movable part 44 that is provided in the driving unit connecting part 40 and is rotatably supported on a rotational shaft 42 along a Y axis direction, a displacement reading part 46 that is provided on a tip end side of the movable part 44 with respect to the rotational shaft 42, and a weight 48 that is adjusted in position on a side opposite to the displacement reading part 46 across the rotational shaft 42.

The displacement detector 18 has a housing 50 configured to surround the driving unit connecting part 40, the movable part 44, the displacement reading part 46 and the weight 48. In the embodiment, a part of each of the driving unit connecting part 40 and the movable part 44 is arranged in the inside of the housing 50. In the embodiment, the displacement reading part 46 is provided on the tip end side of the movable part 44 with respect to the rotational shaft 42, but may be provided in the weight 48-side.

An example of the displacement reading part 46 may include a linear scale, an arc scale, an LVDT (linear variable differential transformer) or the like.

The probe arm 30 of the probe 20 and the movable part 44 of the displacement detector 18 are removably engaged by an engagement mechanism 52 to be described below. The probe arm 30 and the movable part 44 are configured to act as one arm through the engagement mechanism 52. Here, the engagement mechanism 52 is disposed outside of the housing 50 of the displacement detector 18.

It is possible to change a load (measurement force) generated on the sensing pin 32 by adjusting the position of the weight 48. There are some cases where the displacement detector 18 is not provided with the weight 48 depending upon a workpiece to be measured.

In a case of carrying out the measurement, the sensing pins 32 provided in the tip end part of the probe 20 in the displacement detector 18 are caused to make contact with a surface of a workpiece (unillustrated) placed on the surface plate 12 by a constant force. In this state, the X axis driving unit 16 moves the probe 20 and the displacement detector 18 along an X axis, that is, slides them in an axial direction of the arm. When the arm is slid in the axial direction, the sensing pin 32 displaces in a Z axis direction according to a shape of the surface of the workpiece. The arm composed of the probe arm 30 and the movable part 44 rotates around the rotational shaft 42. A displacement of the movable part 44 is detected by the displacement reading part 46. Thereby a signal corresponding to the displacement of the sensing pin 32 in the Z axis direction is outputted from the displacement reading part 46. It is possible to measure a surface texture of the workpiece such as the surface roughness and/or the contour.

The surface roughness measurement is carried out by detecting fine irregularities of the workpiece surface to detect a change in height of a small length on the workpiece surface, that is, a change in height in a short cycle. On the other hand, the contour measurement is carried out by detecting a change in height on the workpiece surface in a relatively long cycle.

Figure 3:
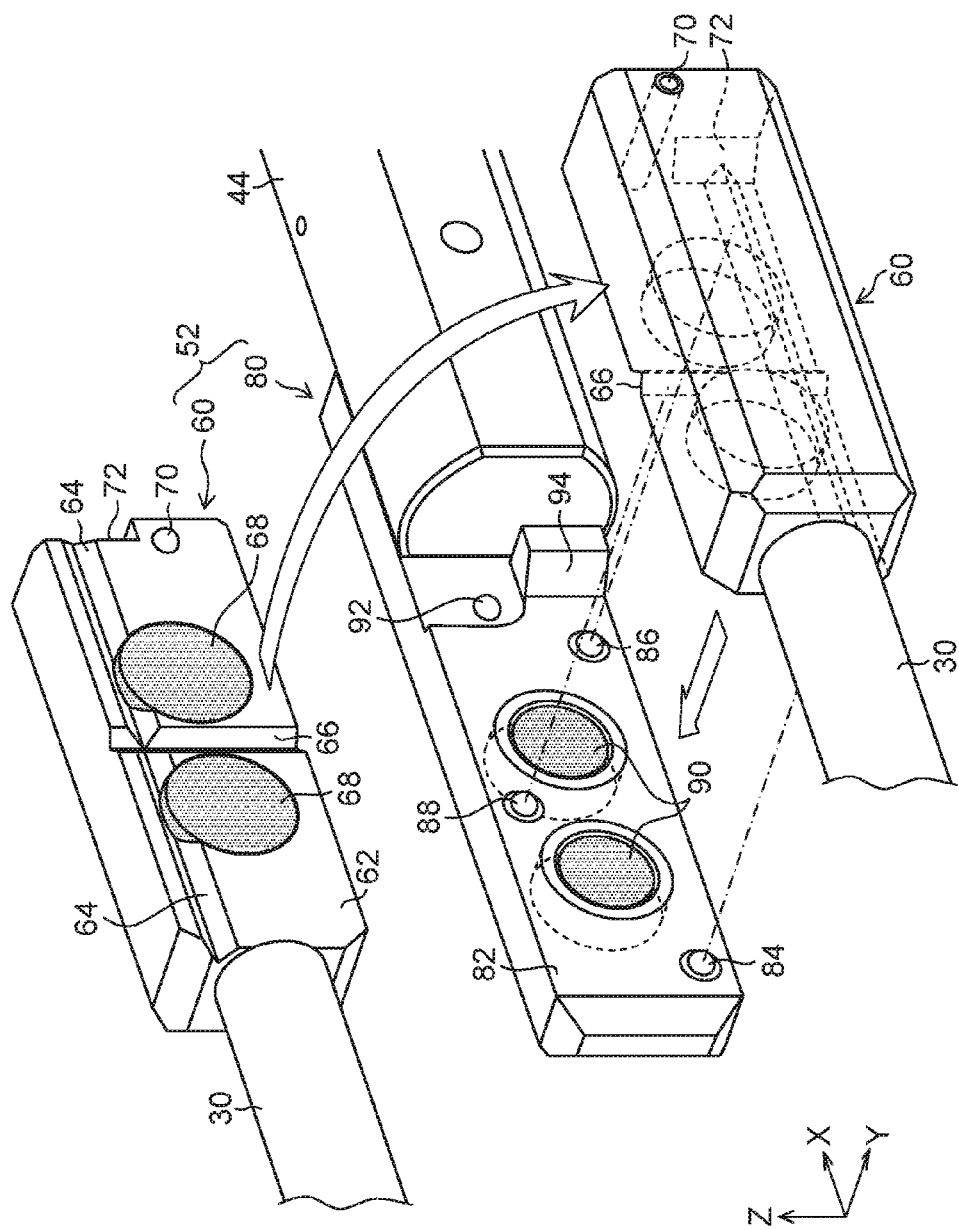
FIG. 3 is an exploded perspective view illustrating an engagement mechanism.

Next, the removal engagement mechanism 52 in the present embodiment will be explained with reference to FIG. 3. The removal engagement mechanism 52 is, as illustrated in FIG. 3, includes a first engagement member 60 provided in the base end side of the probe arm 30 and a second engagement member 80 provided in the tip end side of the movable part 44. That is, the engagement mechanism 52 enables the sensing pin side (probe arm 30) of the arm to be removable from the base end side (movable part 44) of the arm. The first engagement member 60 and the second engagement member 80 have two engagement surfaces 62 and 82 which face each other, are perpendicular to the workpiece surface and are parallel to the axial direction (X axis direction) of the arm. The first engagement member 60 and the second engagement member 80 are removably attracted each other by magnetized members 68 and magnets 90 which are respectively provided in corresponding positions on the engagement surfaces 62 and 82. "Being perpendicular" to the workpiece surface includes being perpendicular (parallel to the Z axis) and being approximately perpendicular. The two facing engagement surfaces 62 and 82 which are parallel to each other include being parallel and being approximately parallel to each other.

The first engagement member 60 is made of a metal, and is formed in an approximately cubical shape. However, a material of the first engagement member 60 is not necessary to be entirely formed of a rigid body. It is sufficient that the first engagement member 60 is configured such that at least a first grooves 64 and a second groove 66 are formed of a rigid body that is not deformed by repeated removals. For example, when it is desired to reduce a weight of the engagement mechanism 52, the first engagement member 60 may be formed of combined materials of a metal in which the first grooves 64 and the second groove 66 are simultaneously processed and carbon jointed to the metal. In addition, the first engagement member 60 is preferably formed of a non-magnetic body so as not to interrupt attraction between the magnetized member 68 and the magnet 90 to be described later. In the first engagement member 60, the engagement surface 62 that makes contact with the second engagement member 80 has the linear first grooves 64 which is formed in a V-shaped cross section and is parallel to the axial direction of the probe arm 30, and the linear second groove 66 which is formed in a V-shaped cross section and is perpendicular to the axial direction of the probe arm 30. In FIG. 3, the linear first grooves 64 intersect with the linear second groove 66, but the linear first grooves 64 is not required to intersect with the linear second groove 66. In some cases the first grooves 64 and the second groove 66 are collectively called the grooves 64 and 66.

The first engagement member 60 has the two circular magnetized members 68 in approximately symmetric positions across the second groove 66. A material of the magnetized member 68 is not limited as long as the material is a magnetic body which can be attracted to the magnet 90 to be described later.

An operating pin 70 is provided in the base end side of the engagement surface 62 in the first engagement member 60 so as to penetrate a through hole formed in the first engagement member 60.

The second engagement member 80 is made of a metal, and is formed in an approximately cubical shape. However, in regard to a material thereof, as similar to the first engagement member 60, the entirety of the second engagement member 80 is not necessary to be formed of a rigid body, and the second engagement member 80 may be made of combined materials, and is preferably formed of a non-magnetic body. The second engagement member 80 is formed to be thinner in thickness in a Y axis direction as compared to the first engagement member 60.

In the second engagement member 80, the engagement surface 82 that makes contact with the first engagement member 60 is provided with: a first spherical positioning pin 84 and a second spherical positioning pin 86 that are arranged in a position corresponding to the first grooves 64 and are engaged to the first grooves 64 and a third spherical positioning pin 88 that is arranged in a position corresponding to the second groove 66 and is engaged to the second groove 66. The first positioning pin 84, the second positioning pin 86 and the third positioning pin 88 are collectively called the positioning pins 84, 86 and 88 in some cases.

In addition, in the second engagement member 80, the two circular magnets 90 are arranged on the engagement surface 82 in positions corresponding to the two magnetized members 68. Further, a sensor 92 is provided in the base end side of the engagement surface 82 in the second engagement member 80 in a position corresponding to the operating pin 70.

An inclined part 94 that is inclined to the X axis direction is provided on the engagement surface 82 in the base end side of the second engagement member 80. When viewed from the Z axis direction, the inclined part 94 is inclined so as to be closer to the base end side of the second engagement member 80, as the inclined part 94 approaches to the engagement surface 62 of the first engagement member 60. The inclined part 94 is perpendicular to the workpiece surface and is inclined to the engagement surface 82. "Being perpendicular" to the workpiece surface includes being perpendicular (parallel to the Z axis) and being approximately perpendicular.

An inclined surface 72 is provided in the first engagement member 60 in a position facing (opposite to) the inclined part 94 of the second engagement member 80. The inclined surface 72 facing the inclined part 94 is formed on the engagement surface 62 in the opposite side to the engagement surface 82 on which the inclined part 94 is formed. The inclined surface 72 and the inclined part 94 will be described later.

As illustrated in FIG. 3, the engagement surface 62 of the first engagement member 60 and the engagement surface 82 of the second engagement member 80 are arranged in positions facing each other. The first grooves 64 and the second groove 66 of the first engagement member 60 are approximately adjusted in position (aligned) to the first positioning pin 84, the second positioning pin 86 and the third positioning pin 88 of the second engagement member 80. As illustrated in an arrow, the magnetized members 68 are attracted along the Y axis direction by magnetic forces of the magnets 90. As a result, the engagement surface 62 of the first engagement member 60 and the engagement surface 82 of the second engagement member 80 attract each other.

At this time, the first positioning pin 84 and the second positioning pin 86 are guided to the first grooves 64, and the third positioning pin 88 is guided to the second groove 66. Thereby the engagement surface 62 of the first engagement member 60 and the engagement surface 82 of the second engagement member 80 are adjusted in position, and the first engagement member 60 and the second engagement member 80 attract each other by the magnetic force.

Figure 4:
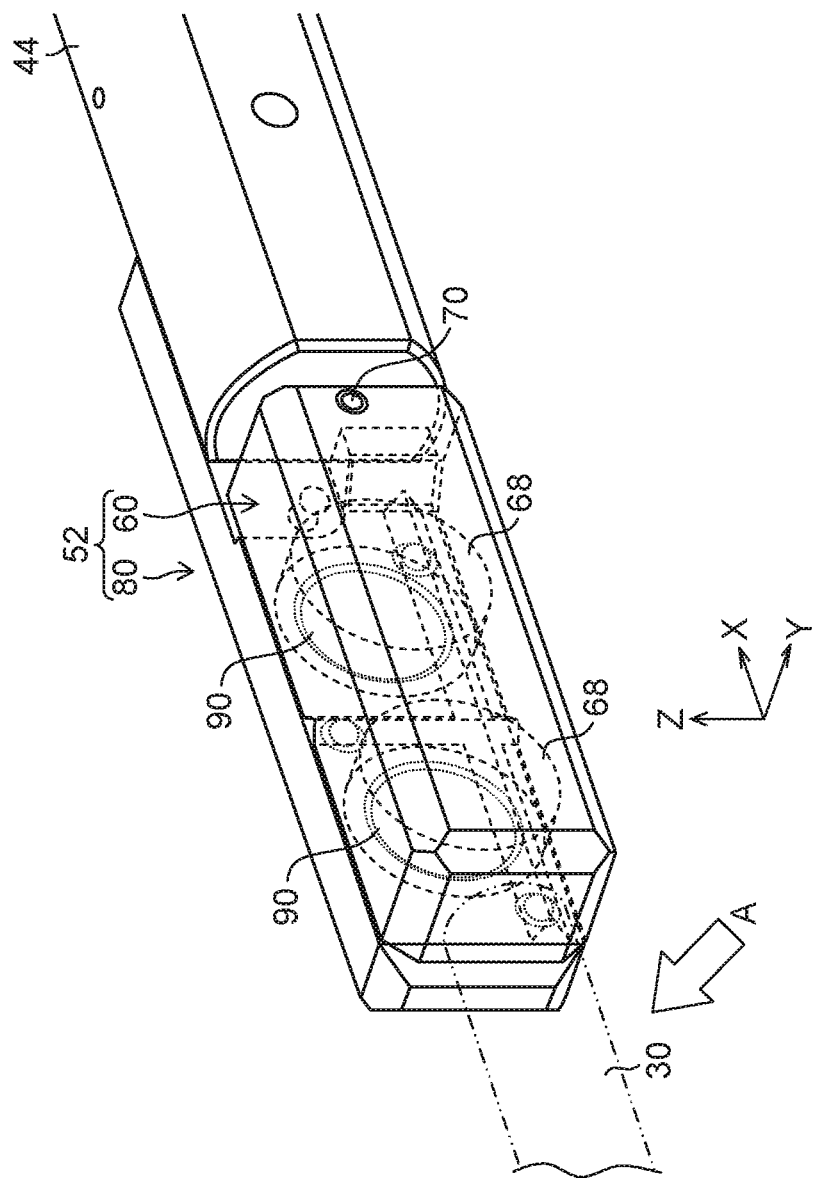
FIG. 4 is a perspective view illustrating an engagement state of the engagement mechanism.

As illustrated in FIG. 4, the probe 20 is removably engaged to the movable part 44 by the engagement mechanism 52 formed of the first engagement member 60 and the second engagement member 80. In the present embodiment, since the two magnets 90 and the two magnetized members

68 are provided, even if a force is applied from a direction indicated with an arrow A, it is possible to maintain the attracted state between the first engagement member 60 and the second engagement member 80. Here, the magnetized member 68 and the magnet 90 respectively are only required to include at least one magnetized member and one magnet.

In the present embodiment, since the grooves 64 and 66 are produced in a straight line by performing milling or the like to the first engagement member 60, the grooves 64 and 66 with excellent parallelism and orthogonality to the probe arm 30 can be produced.

In a case of exchanging the plurality of probes 20 to be used, it is always necessary to maintain constant attachment accuracy (positioning accuracy, an attraction force and the like) between the probe 20 and the movable part 44. In the present embodiment, since the grooves 64 and 66 having the V-shaped cross section are simple in the structure and their processing accuracy can be easily secured, the attachment accuracy can be maintained to be constant.

Also at the time of attachment, since the first groove 64 is formed in a straight line in parallel along a relative feeding direction, the first positioning pin 84 and the second positioning pin 86 are only required to be slid to be fitted in the first groove 64. At the time of sliding also, when the third positioning pin 88 is fitted in the second groove 66 by sliding the first positioning pin 84 in parallel in the X axis direction, it is possible to accurately seat the probe 20 while acting with the magnetized members 68.

It is important that the first groove 64 is formed as a groove in parallel to the arm shaft. This has a large impact on the measurement accuracy, particularly in the Z axis direction, that is, in a direction of the measurement by up and down movements of the arm in relation to a 0 point position of the displacement detector disposed in the base end side of the arm. For example, in a case of forming fitting holes in the respective sides and securing the attachment accuracy in the Z direction, the positional accuracy and a size of each hole are required to be accurately formed. If a slight deviation in the Z axis direction occurs, that is, the arms are not installed in parallel in the arm base end side and the arm probe side, since the 0 point of the displacement detector deviates, the linearity may deviate. In addition, an error may be caused by making the stylus into contact with the workpiece at a position other than a desired position. Therefore the mechanism which accurately attaches the arms in parallel to each other is important.

In addition, it is important that the first groove 64 is perpendicular to the measurement direction, in other words, to a direction where the measurement force acts. In a case where a force is applied in parallel to the groove, the movement along the groove can be achieved with a small force. However, even when a large force is applied in a direction perpendicular to the groove, it is difficult to move and the position is extremely stable. This is because the positioning pins substantially make contact with the groove in two positions in the cross section of the groove, that is, the arms are substantially contacted and supported in only two points positioned to each other in the Z axis direction.

As described before, since the first grooves 64 are produced in a straight line, the probe arm 30 to be exchanged itself has small variations in component accuracy in parallelism of the groove. In addition, since the probe arm 30 is seated while sliding in the groove in parallel when the arm 30 is attached, reproducibility in the attachment is very high. As a result, it is possible to exactly attach various arms with accuracy. Particularly since more the probe side of the arm are exchanged than the base end part of the arm, it is desirable that the first groove 64 is provided in the probe side of the arm, if possible.

In FIG. 3, there is illustrated an example where the grooves 64 and 66 are provided in the first engagement member 60 provided in the base end side of the probe 20 and the positioning pins 84, 86 and 88 are provided in the second engagement member 80 of the movable part 44. The present invention is not limited thereto. The positioning pins 84, 86 and 88 may be provided in the first engagement member 60, and the grooves 64 and 66 may be provided in the second engagement member 80.

That is, the first grooves 64 and the second groove 66 are formed in any one of the engagement surface 62 in the first engagement member 60 or the engagement surface 82 in the second engagement member 80, and the positioning pins 84, 86 and 88 can be provided in the other of the engagement surface 62 in the first engagement member 60 or the engagement surface 82 in the second engagement member 80.

It is preferable to provide the grooves 64 and 66 in the first engagement member 60 provided in the base end side of the probe 20. In a case of exchanging a plurality of probes 20 depending on the workpiece, it is preferable that variations in positional accuracy between the probes 20 are small. Accordingly, it is preferable to provide the grooves 64 and 66, which are simple in the structure and their processing accuracy is easily secured, in the first engagement member 60.

As long as the positioning adjustment can be performed to the third positioning pin 88, the second groove 66 is not limited to the groove, but may be a hole. Therefore another engagement part can formed with a configuration different from the first groove 64 formed in the engagement surface 62, including the second groove 66 and the hole. In addition, if it is possible to be fitted in the other engagement part, a second fitting pin including the third positioning pin 88 is configured.

Next, an explanation will be made about a difference in the pulling force (component force) between the engagement mechanism in the present embodiment and the conventional engagement mechanism with reference to FIG. 5.

(A) portion of FIG. 5 illustrates the engagement mechanism in the present embodiment. As illustrated in the drawing, when the first engagement member and the second engagement member are attracted by magnetic force, the positioning pins 84, 86 and 88 make contact with the grooves 64 and 66. An attraction force F acts on the positioning pins 84, 86 and 88. The attraction force F is composed of a component force F1 in a perpendicular direction to the inclination of the grooves 64 and 66, and a pulling force (component force) F2 in a direction in parallel to the inclination, the pulling force F2 causing the pins to move to the seating positions.

When the first engagement member and the second engagement member are attracted by the magnetic force and a distance between both the members becomes small, the positioning pins 84, 86 and 88 move to bottom portions of the grooves 64 and 66, that is, to the seating positions by the pulling force F2. As illustrated in (A) portion of FIG. 5, the pulling force F2 does not nearly change during a period from a time when the positioning pins 84, 86 and 88 make contact with the grooves 64 and 66 to a time when the positioning pins 84, 86 and 88 move to the seating positions. That is, it is possible to stably move the positioning pins 84, 86 and 88 to the seating positions in the grooves 64 and 66.

(B) portion of FIG. 5 illustrates the conventional engagement mechanism. The conventional engagement mechanism is configured of a pair of columnar positioning members 200 and 200 and a spherical pin 210. As illustrated in the drawing, when the first engagement member and the second engagement member are attracted by magnetic force, one positioning member 200 makes contact with the pin 210. An attraction force F acts on the pin 210. The attraction force F is composed of a component force F1 in a perpendicular direction to a tangential direction of the positioning member 200 and the pin 210 and a pulling force (component force) F2 in a direction in parallel to the tangential direction. Since the pulling force (component force) F2 is in parallel to the tangential direction, a magnitude of the pulling force F2 varies depending upon a position where the positioning member 200 makes contact with the pin 210.

When the first engagement member and the second engagement member are attracted by the magnetic force and a distance between both the members becomes small, the pin 210 moves to a position of making contact with the pair of columnar positioning members 200 and 200, that is, to the seating position by the pulling force F2. As illustrated in (B) portion of FIG. 5, the pulling force F2 varies largely during a period from a time when the pin 210 makes contact with the positioning members 200 to a time when the pin 210 moves to the seating position. Particularly, at the time when one positioning member 200 contacts with the pin 210, the pulling force F2 is not large. In a case where the pulling force F2 is small, it takes time until the pin 210 moves to the seating position, and in some cases there is a possibility that the pin 210 is not exactly seated due to a shortage of the pulling force F2.

It is possible to make the pulling force F2 large in order to move the pin 210 to the seating position by increasing the magnetic force for increasing the attraction force F. However, when the attraction force F is made large, an engagement force between the first engagement member and the second engagement member becomes strong. By doing so, at the time of separating the first engagement member from the second engagement member, a large force becomes required and easiness of the removal is possibly interrupted.

The present embodiment indicates an example where an angle θ of each of the grooves 64 and 66 in the V-shaped cross section is 90°, but the angle θ may be determined in a range of 80° to 120° in consideration of a contact force between the sensing pin 32 and the workpiece, a magnitude of the attraction force F, a magnitude of the pulling force F2 due to a difference in friction coefficient between materials of the first groove 64 and the second groove 66, and the like.

In the present embodiment, a case where the grooves 64 and 66 each have the shape of the V-shaped cross section is explained, but, not limited thereto, the grooves 64 and 66 each may have a U-shaped cross section, for example. In addition, a case where the positioning pins 84, 86 and 88 are spherical is explained, but may be semi-spherical or the like. In addition, the positioning pins as well may be formed into a shape which is slightly longer along the groove. When the pins slightly extend in the longitudinal direction along the linearity of the groove, the attachment parallelism of the arms of each other further improves due to a fitting effect of the straight lines each other as well. Further, not a pin but a long mountainous shaped member (plate) that can be fitted in the groove may be applied. That is, two positioning pins may be exchanged by one long mountainous shaped pin. This is because one long mountainous shaped pin corresponds to the structure that two or more positioning pins are continuously arranged. One long mountainous shaped pin satisfies the requirement of the two positioning pins. However, whether the pin or the long mountainous shaped member, it is important that one certainly forms a linear groove along the arm axis direction. Here, one long mountainous shaped pin and a plurality of positioning pins configure the first fitting pin positioned to be fitted in the first groove 64.

As long as the positioning pins 84, 86 and 88 are shaped to be guided to the grooves 64 and 66, a shape of each of the positioning pins 84, 86 and 88 and a shape of each of the grooves 64 and 66 are not limited.

As compared between the engagement surface of the arm in the probe side and the engagement surface of the arm in the base end side, a material hardness of the member in the base end side is preferably set higher.

This is because the arm in the probe side is exchanged each time the probe is worn away by the measurement, but the arm in the base end side is not nearly exchanged. Therefore a case where a slightly more flexible material is used for the engagement surface in the probe side as compared to that of the base end side is desirable in view of a long term use. For example, it is considered that the engagement surface in the probe side is configured of an aluminum alloy, a copper alloy or the like, and the engagement surface in the base end side is configured of ceramics, stainless, titan, an ultra-hard material or the like. Both the surfaces may be configured of the same material such as stainless.

Figure 6:
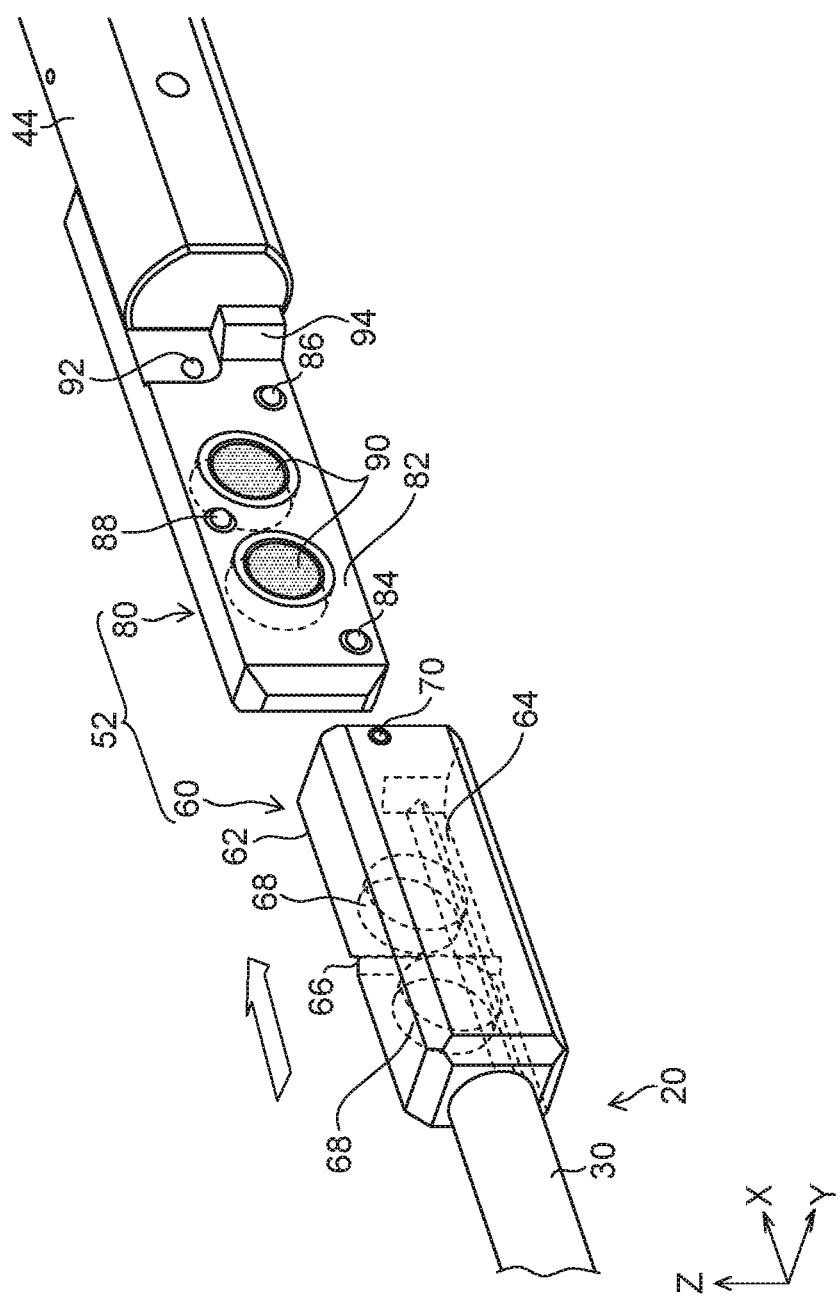
FIG. 6 is an explanatory diagram explaining an engagement direction of the engagement mechanism.

Next, an explanation will be made about the engagement direction of the first engagement member 60 and the second engagement member 80 with reference to FIG. 6. In the embodiment illustrated in FIG. 3, explanation has been made for a case where the first engagement member 60 and the second engagement member 80 are made closer to each other in the Y axis direction to engage them with each other. As illustrated in FIG. 6, in the present embodiment, the first engagement member 60 and the second engagement member 80 can be made closer to each other in the X axis direction to engage them with each other. The first groove 64 is formed in a straight line over an entire region of the engagement surface 62 of the first engagement member 60 in the X axis direction. While the first positioning pin 84 and the second positioning pin 86 are slid along the first groove 64, the first engagement member 60 and the second engagement member 80 can be positioned and attracted each other.

Next, an explanation will be made about functions of a sensor and an operating pin with reference to FIG. 7. (A) portion of FIG. 7 is a top view illustrating a state where the first engagement member 60 and the second engagement member 80 are engaged as viewed in the Z axis direction. In a case where the first engagement member 60 and the second engagement member 80 are engaged, an operating pin 70 of the first engagement member 60 is in contact with a sensor 92 of the second engagement member 80. A detection circuit (unillustrated) for detecting contact and non-contact is constituted by the operating pin 70 and the sensor 92. The detection circuit can detect the contact and the non-contact between the operating pin 70 and the sensor 92.

In a state illustrated in (A) portion of FIG. 7, the detection circuit detects that the operating pin 70 and the sensor 92 are in a contact state, and notifies an operator that the shape measuring apparatus is in a contact state.

As illustrated in (B) portion of FIG. 7, for example, in a case where an unexpected force is applied to the probe arm 30, the operating pin 70 and the sensor 92 become in a non-contact state. The detection circuit detects that the operating pin 70 and the sensor 92 are in the non-contact state, and notifies an operator that the shape measuring apparatus is in the non-contact state. Further, information of the non-contact from the detection circuit is transmitted to a control device (unillustrated), and the control device stops a drive of the X axis driving unit 16 to stop the measurement. When the column 14 is being driven, a drive of the column 14 is stopped. This arrangement is made for preventing a failure or the like of the shape measuring apparatus.

The operating pin 70 is fitted in the through hole on the first engagement member 60. A length of the operating pin 70 projecting from the engagement surface 62 can be adjusted by moving the operating pin 70 in the inside of the through hole. It is possible to adjust sensibility of the sensor 92 by adjusting the length of the operating pin 70.

Figure 8:
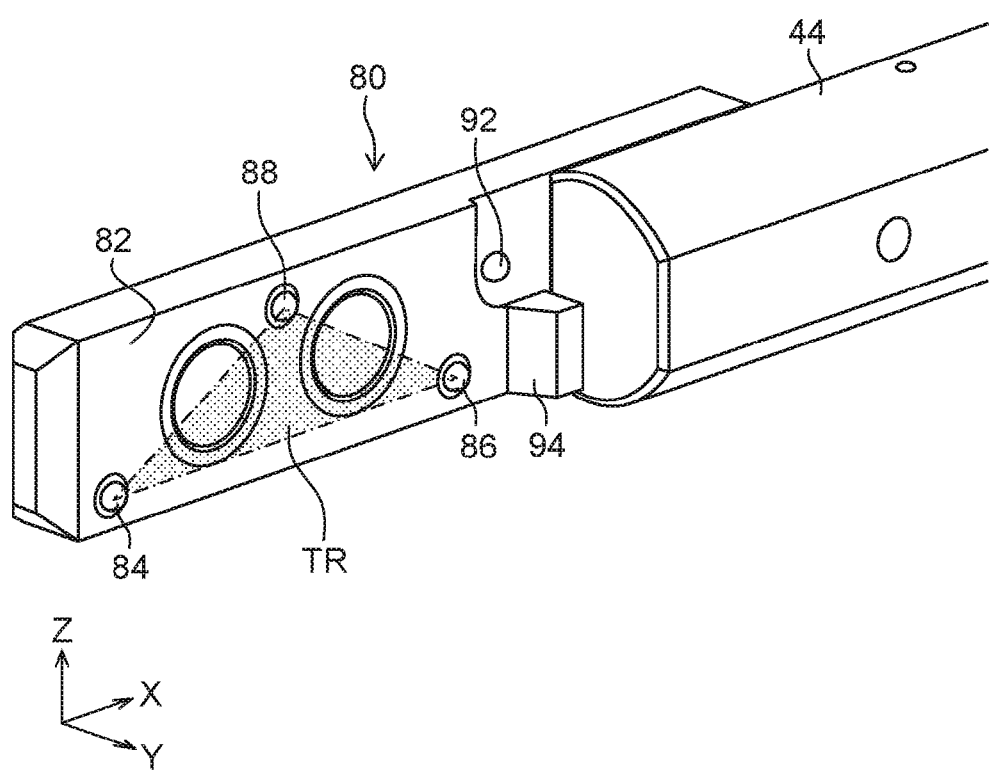
FIG. 8 is an explanatory diagram explaining positions of the sensor and the operating pin.

Next, an explanation will be made about a preferred position of the sensor 92 with reference to FIG. 8. FIG. 8 is a perspective view of the engagement surface 82 of the second engagement member 80 as viewed in the Y axis direction. The sensor 92 can be provided anywhere on the engagement surface 82 of the second engagement member 80. In the present embodiment, it is preferable that the sensor 92 is provided outside of a virtual triangle TR connecting the positioning pins 84, 86 and 88, and in the base end side of the second engagement member 80.

In a case where an unexpected force is applied to the probe arm 30 in the Y axis direction, as illustrated in (B) portion of FIG. 7 the first engagement member 60 is, in many cases, separated from the second engagement member 80 with a rotation around the tip end side. Accordingly it is preferable that the sensor 92 is arranged in the base end side of the second engagement member 60 which is away from the tip end side, and that the operating pin 70 is arranged in the base end side of the first engagement member 60. When a force is applied to the first engagement member 60, as a distance from the rotational fulcrum (rotational center) to the operating pin 70 is the longer, a movement distance of the operating pin 70 is the longer. Therefore it is possible to detect the non-contact state with a higher sensitivity.

However, the position of each of the operating pin 70 and the sensor 92 is not limited to the embodiment, but the position of each of the sensor 92 and the operating pin 70 can be determined in accordance with the sensibility.

Next, an explanation will be made about a preferred embodiment which can avoid an impact in the X axis direction with reference to FIG. 9. (A) portion in FIG. 9 is a top view illustrating a state where the first engagement member 60 and the second engagement member 80 are engaged as viewed in the Z axis direction. As similar to (A) portion of FIG. 7, in a case where the first engagement member 60 and the second engagement member 80 are engaged, the operating pin 70 of the first engagement member 60 is in contact with the sensor 92 of the second engagement member 80.

(B) portion of FIG. 9 is a lower view illustrating a state where the first engagement member 60 and the second engagement member 80 are engaged as viewed in the Z axis direction. In this state, the inclined surface 72 of the first engagement member 60 and an inclined surface of the inclined part 94 in the second engagement member 80 are arranged in positions facing each other.

As illustrated in (C) portion of FIG. 9, for example, in a case where the probe 20 receives a strong force (impact) in the X axis direction in the halfway of measuring a shape of the workpiece, the probe 20 and the first engagement member 60 move in the X axis direction. As a movement distance of the first engagement member 60 is longer, the operating pin 70 and the sensor 92 of the second engagement member 80 become in a non-contact state.

When the detection circuit detects the non-contact, the control device stops a drive of the X axis driving unit 16. However, the probe 20 and the first engagement member 60 which have received the impact move to the side of the movable part 44 by an inertia force. Next, the inclined surface 72 of the first engagement member 60 makes contact with the inclined part 94 in the second engagement member 80, and the first engagement member 60 slides along the inclined part 94 in the second engagement member 80 to be moved in a direction of an arrow B.

That is, when the arm (probe arm 30) in the sensing pin 32-side is pressed on the arm (movable part 44) in the base end side, the arm in the sensing pin side slides on the surface of the inclined part 94 and is released from the arm in the base end side. Thereby the contact between the first engagement member 60 and the movable part 44 can be avoided to prevent an impact from being applied to the displacement detector 18 including the movable part 44. Particularly the impact can be prevented from being applied to the rotational shaft 42. This is because when an axis deviation or the like occurs in the rotational shaft 42 due to the impact, there are some cases where reproducibility of the measurement accuracy of the displacement detector 18 is lowered.

Further, the operating pin 70 is arranged closer to the inclined surface 72 than the magnetized member 68 and the positioning pins 84, 86 and 88. As a result, the operating pin 70 comes off immediately by the previously explained principle. Even if an abrupt impact is applied in the X axis direction, since the operating pin 70 comes off immediately, it is possible to protect the displacement detector 18.

In the present embodiment, a case where the engagement surfaces 62 and 82 are provided with the inclined surface 72 and the inclined part 94 is explained. However, when the inclined part 94 is provided at least, the arm in the sensing pin side is caused to slide on the surface of the inclined part 94, making it possible to cause the arm in the sensing pin side to be released from the arm in the base end side. In a case of being provided with the inclined surface 72, it is possible to cause the arm in the sensing pin side to slide on the surface of the inclined part 94 more easily.

Figure 10:
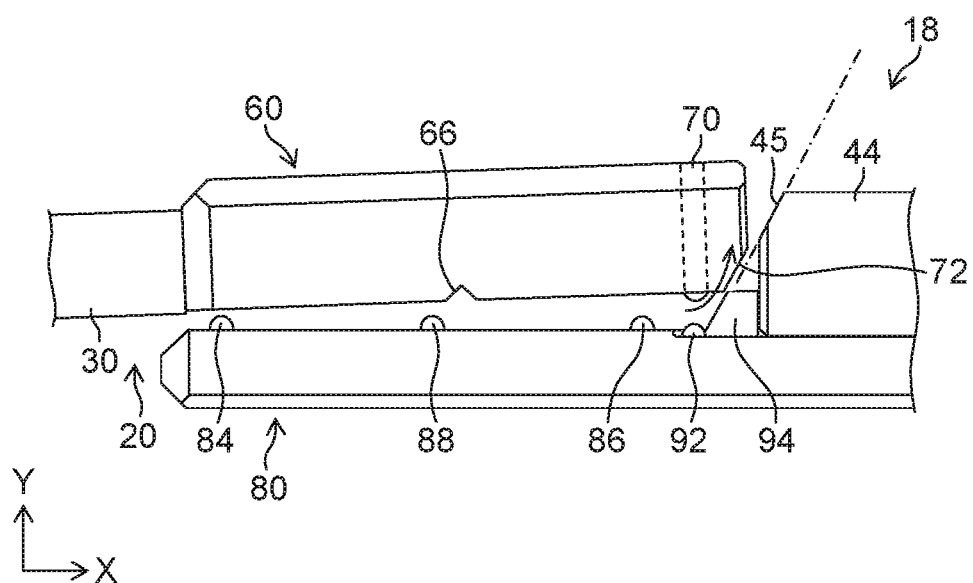
FIG. 10 is a schematic configuration diagram illustrating another engagement mechanism for avoiding the impact.

Next, an explanation will be made about another preferred embodiment which can avoid an impact in the X axis direction with reference to FIG. 10. Components identical to those in the engagement mechanism illustrated in FIG. 9 are referred to as identical reference numerals and an explanation thereof may be omitted. FIG. 10 is a lower view illustrating a state where an impact is applied to the first engagement member 60 and the second engagement member 80 in the X axis direction as viewed in the Z axis direction. In this embodiment, a notch part 45 which has an inclined surface in parallel to the inclined part 94 is formed in the tip end side of the movable part 44 (arm in the base end side). Even if an impact is applied in the X axis direction, it is possible to more certainly avoid contact between the first engagement member 60 and the movable part 44. Herein "being parallel" includes a case of "being approximately parallel".

FIG. 11 shows schematic configuration diagrams illustrating an engagement mechanism according to another embodiment. Components identical to those in the engagement mechanism illustrated in FIG. 9 or FIG. 10 are referred to as identical reference numerals and an explanation thereof may be omitted.

(A) portion in FIG. 11 is a top view illustrating a state where the first engagement member 60 and the second engagement member 80 are engaged as viewed in the Z axis direction. In the present embodiment, the positioning pins 84, 86 and 88 are formed in the engagement surface 62 of the first engagement member 60. A first groove (unillustrated) and the second groove 66 are formed in the engagement surface 82 of the second engagement member 80.

Further, a second inclined surface 100 is formed on the engagement surface 62 of the first engagement member 60 in the sensing pin side at the opposite side to the inclined surface 72. A second inclined part 102 is formed on the engagement surface 82 of the second engagement member 80 in the sensing pin side at the opposite side to the inclined part 94. The second inclined surface 100 and the second inclined part 102 are respectively arranged in positions facing each other.

As illustrated in (B) portion of FIG. 11, in a case where the probe 20 receives a strong force (impact) in the X axis direction in the halfway of measuring a shape of the workpiece, the probe 20 and the first engagement member 60 move in the X axis direction. Next, the inclined surface 72 of the first engagement member 60 makes contact with the inclined part 94 in the second engagement member 80, and the first engagement member 60 slides along the inclined part 94 in the second engagement member 80 to be moved in a direction of an arrow C.

That is, when the arm (probe arm 30) in the sensing pin 32-side is pressed on the arm (movable part 44) in the base end side, the arm in the sensing pin side slides on the surface of the inclined part 94 to be out of the arm in the base end side. Thereby the contact between the first engagement member 60 and the movable part 44 can be avoided to prevent an impact from being applied to the displacement detector 18 including the movable part 44.

In a case where the probe 20 receives a strong force (impact) in a direction at the opposite side to the X axis direction in the halfway of measuring a shape of the workpiece, the probe 20 and the first engagement member 60 move in a direction at the opposite side to the X axis direction. The second inclined surface 100 of the first engagement member 60 makes contact with the second inclined part 102 in the second engagement member 80, and the first engagement member 60 slides along the second inclined part 102 in the second engagement member 80 to be moved (unillustrated).

Next, when the arm (probe arm 30) in the sensing pin 32-side presses or pulls the arm (movable part 44) in the base end side, a plurality of aspects for avoiding the impact will be explained with reference to FIG. 12.

(A) portion of FIG. 12 illustrates an aspect of the present embodiment. In the present embodiment, the inclined part 94 is provided in the second engagement member 80 as a running-on part in which the arm in the sensing pin side (probe arm 30) runs on the arm in the base end side (movable part 44).

Accordingly when the arm in the sensing pin side presses or pulls the arm in the base end side, the arm in the sensing pin side slides on a surface of the inclined part 94 (running-on part) and runs on it to be released from the arm in the base end side.

(B) portion of FIG. 12 illustrates another aspect of the present embodiment. In the embodiment, a projecting part 110 is provided in the second engagement member 80 as a running-on part in which the arm in the sensing pin side runs on the arm in the base end side.

Accordingly when the arm in the sensing pin side presses or pulls the arm in the base end side, the arm in the sensing pin side slides on a surface of the projecting part 110 (running-on part) and runs on it to be released from the arm in the base end side.

(C) portion of FIG. 12 illustrates further another aspect of the present embodiment. In the embodiment, the projecting part 110 is provided in the second engagement member 80 as a running-on part in which the arm in the sensing pin side runs on the arm in the base end side. In addition, a projecting part 112 is provided in the first engagement member 60 in a position facing the projecting part 110.

Accordingly when the arm in the sensing pin side presses or pulls the arm in the base end side, the projecting part 112 of the arm in the sensing pin side slides on the surface of the projecting part 110 (running-on part) and runs on it to be released from the arm in the base end side.

(D) portion of FIG. 12 illustrates still further another aspect of the present embodiment. In the embodiment, the projecting part 110 is provided in the second engagement member 80 as a running-on part on which the arm in the sensing pin side runs to the arm in the base end side. In addition, an inclined surface 72 is provided in the first engagement member 60 in a position facing the projecting part 110.

Accordingly when the arm in the sensing pin side presses or pulls the arm in the base end side, the inclined surface 72 of the arm in the sensing pin side slides on the surface of the projecting part 110 (running-on part) and runs on it to be released from the arm in the base end side.

When the engagement surfaces 62 and 82 are perpendicular to the workpiece, it is possible to set such that the engagement surfaces 62 and 82 can disengage with each other if a constant load or more is simply axially applied on the engagement surfaces 62 and 82, regardless of a change in measurement pressures or an abrupt change in a workpiece shape. On the other hand, when the engagement surfaces 62 and 82 are in parallel to the workpiece, there are some cases where the engagement surfaces 62 and 82 disengage with each other even by the measurement pressure, which possibly causes the engagement to be unstable. It is preferable that the engagement surfaces 62 and 82 are perpendicular to the workpiece.

Figure 13:
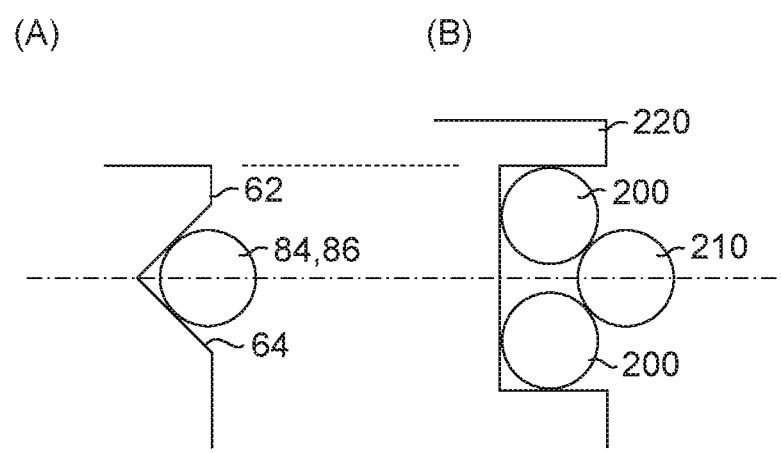
FIG. 13 shows schematic diagrams illustrating a difference between the engagement mechanism of the present embodiment and a conventional engagement mechanism.

Finally an explanation will be made about a difference between the engagement mechanism of the present embodiment and the conventional engagement mechanism in regard to the structure with reference to FIG. 13. (A) portion of FIG. 13 illustrates the engagement mechanism of the present embodiment. In the present embodiment, the first groove 64 having the V-shape is formed on the engagement surface 62. Since the first groove 64 is formed by machining, the first groove 64 can be provided near the end surface of the first engagement member 60.

(B) portion of FIG. 13 illustrates the conventional engagement mechanism. Since a pair of columnar positioning members 200 and 200 are provided in the conventional engagement mechanism, a holder (wall) 220 is necessary for holding the positioning members 200 and 200. Therefore, as illustrated in FIG. 13, the engagement member of the engagement mechanism in the present embodiment can be made smaller as compared to that of the conventional engagement mechanism.

In a case where the engagement members are formed in the same size, since the first groove 64 can be formed in the end surface side, a distance between the first positioning pin 84 and the second positioning pin 86, and the third positioning pin 88 can be made long. That is, since a virtual triangle (refer to FIG. 8) connecting the positioning pins 84, 86 and 88 can be made large, it is possible to stably engage the first engagement member 60 and the second engagement member 80.

What is claimed is:

1. A shape measuring apparatus for measuring roughness and/or contour of a surface of a workpiece by sliding a sensing pin provided on a tip end side of an arm with respect to the workpiece in an axial direction of the arm, wherein
the arm includes an engagement mechanism which makes a sensing pin side of the arm removable from a base end side of the arm, the engagement mechanism including two engagement surfaces configured to face each other, to be perpendicular to the surface of the workpiece and to be parallel to the axial direction of the arm, wherein the two engagement surfaces attract each other by a magnet and a magnetized member in corresponding positions on the engagement surfaces,
one of the engagement surfaces includes a linear first groove that is parallel to an axis of the arm and is formed over an entire region of the engagement surface, and another engagement part that is different from the first groove, and
another of the engagement surfaces includes a first fitting pin that is positioned to be fitted into the first groove and a second fitting pin that is configured to be fitted into the another engagement part.

2. The shape measuring apparatus according to claim 1, wherein
the another engagement part is formed of a second groove.

3. The shape measuring apparatus according to claim 2, wherein
the first groove and the second groove respectively have a V-shaped cross section.

4. The shape measuring apparatus according to claim 3, wherein
an angle of each of the first groove and the second groove formed in the V-shaped cross section is within a range of 80° or more to 120° or less.

5. The shape measuring apparatus according to claim 2, wherein
the second groove is perpendicular to the axis of the arm.

6. The shape measuring apparatus according to claim 1, wherein
the first fitting pin comprises a first positioning pin and a second positioning pin, and the second fitting pin comprises a third positioning pin.

7. The shape measuring apparatus according to claim 6, wherein
the first positioning pin, the second positioning pin and the third positioning pin are spherical.

8. The shape measuring apparatus according to claim 6, comprising
a detection circuit including an operating pin provided on the one of the engagement surfaces and a sensor provided on the another of the engagement surfaces, the detection circuit being configured to detect contact and non-contact of the engagement surfaces.

9. The shape measuring apparatus according to claim 8, wherein
the sensor and the operating pin are arranged outside of a virtual triangle connecting the first positioning pin, the second positioning pin and the third positioning pin, and arranged in base end sides of the engagement surfaces.

10. The shape measuring apparatus according to claim 1, wherein
the engagement surface includes an inclined part that is perpendicular to the surface of the workpiece and is inclined to the engagement surface, and
when the arm in the sensing pin side is pressed on the arm in the base end side, the arm in the sensing pin side slides on a surface of the inclined part and is released from the arm in the base end side.

11. A shape measuring apparatus for measuring roughness and/or contour of a surface of a workpiece by sliding a sensing pin provided on a tip end side of an arm with respect to the workpiece in an axial direction of the arm, wherein
the arm includes an engagement mechanism which makes a sensing pin side of the arm removable from a base end side of the arm, the engagement mechanism including two engagement surfaces configured to face each other, to be perpendicular to the surface of the workpiece and to be parallel to the axial direction of the arm, wherein the two engagement surfaces attract each other by a magnet and a magnetized member in corresponding positions on the engagement surfaces,
the engagement surface includes a running-on part which is formed on one of the engagement surfaces, nearer to the base end side than the magnet and the magnetized member in the corresponding positions on the engagement surfaces, is inclined or projected from the one engagement surface toward another facing engagement surface, and is configured to allow the arm in the sensing pin side to run on the arm in the base end side, and
when the arm in the sensing pin side presses the arm in the base end side, the arm in the sensing pin side slides on a surface of the running-on part and runs on the running-on part to be released from the arm in the base end side.

12. The shape measuring apparatus according to claim 11, wherein
the engagement surfaces facing each other are perpendicular to the workpiece.

13. The shape measuring apparatus according to claim 11, wherein
the engagement surface on an opposite side to the engagement surface on which the running-on part is formed includes a surface which faces the running-on part, and the surface slides on the surface of the running-on part.

14. The shape measuring apparatus according to claim 11, comprising
a detection circuit including an operating pin provided on one of the engagement surfaces and a sensor provided on another of the engagement surfaces, the detection circuit configured to detect contact and non-contact of the engagement surfaces.

15. The shape measuring apparatus according to claim 14, wherein
the operating pin provided on the one of the engagement surfaces and the sensor provided on the another of the engagement surfaces are positioned nearer to the base end side of the arm than the magnet and the magnetized member, and
when the arm in the sensing pin side runs on the running-on part, the sensor becomes into a non-contact state and driving of the arm is stopped.

* * * * *